United States Patent [19]

Jones

[11] Patent Number: 5,015,420
[45] Date of Patent: May 14, 1991

[54] EVAPORATIVE COOLING

[76] Inventor: Tom F. Jones, 2400 Arrowhead #265 Abilene, Tex. 7960

[21] Appl. No.: 457,110

[22] Filed: Dec. 26, 1989

[51] Int. Cl.$^5$ ................................................ B01F 3/04
[52] U.S. Cl. ..................................... 261/029; 261/106; 261/71; 261/DIG. 41; 55/528
[58] Field of Search ................. 261/29, 106, DIG. 41, 261/71; 55/528

[56] References Cited

U.S. PATENT DOCUMENTS

| | | | |
|---|---|---|---|
| 2,121,278 | 6/1938 | Babcock | 261/106 |
| 2,233,976 | 3/1941 | Essick | 261/29 |
| 2,637,540 | 5/1953 | Rowe | 261/DIG. 41 |
| 2,829,732 | 4/1958 | Goettl | 55/528 |
| 3,075,750 | 1/1963 | Goettl | 261/DIG. 41 |
| 3,126,428 | 3/1964 | Ash | 261/29 |
| 3,147,319 | 9/1964 | Goettl | 261/29 |
| 3,150,210 | 9/1964 | Goettl | 261/DIG. 41 |
| 3,159,187 | 12/1964 | Barnett | 55/528 |
| 3,193,259 | 7/1965 | Liebmann | 261/106 |
| 3,306,591 | 2/1967 | Valazza | 261/29 |
| 3,778,042 | 12/1973 | Schade et al. | 261/106 |
| 4,045,523 | 8/1977 | Goettl | 261/29 |
| 4,225,539 | 9/1980 | Grants | 261/DIG. 41 |
| 4,333,887 | 6/1982 | Goettl | 261/29 |
| 4,400,185 | 8/1983 | Goettl | 261/29 |
| 4,419,300 | 12/1983 | Van Ness et al. | 261/DIG. 41 |
| 4,562,016 | 12/1985 | Colliver | 261/DIG. 41 |
| 4,840,838 | 6/1989 | Wyss | 55/528 |

FOREIGN PATENT DOCUMENTS 2360490 6/1975 Fed. Rep. of Germany ........ 261/29

Primary Examiner—Tim Miles

[57] ABSTRACT

An improved evaporative cooler containing a new and unique designed funnel induction system, which creates a greater vacuum of air drawn directly through each pad frame equally, and into the split squirrel cage, thereby increasing the vacuum and cooling efficiency by completely bypassing any heat generated or trapped inside the evaporative coolers dead space. The wettable air permeable pads have been redesigned and incorporated in a sandwich-type installation, being constructed of an absorbent spong-like plastic fiber, backed by a layer of coarse mesh-like type plastic fiber filter, thus providing a cleaner hygienic air supply,—at the same time reducing the amount of water needed in prior art evaporative coolers. In addition, an improved independent recycling water containment system, replaceable, and by design retains water and traps moisture away from the sump pan, motor and other components inside the improved evaporative cooler cabinet, therein greatly reducing rust and corrosion, and providing longer life to the operation of the improved evaporative cooler. Also, an improved swing-away motor mount bracket. Female electrical receptacles are provided for quick connection or disconnection of the electrical motor and water pump. A ventilated back access panel provides ease and accessibility during times of maintenance, repair or replacement of the improved evaporative cooler's components.

3 Claims, 6 Drawing Sheets

EVAPORATIVE COOLING

BACKGROUND OF THE INVENTION

Field of the Invention

The present invention relates generally to an evaporative cooling device and more particularly to an improved evaporative cooling system incorporating a unique funnel induction system, designed to draw fresh air into and through the newly designed water retention permeable pads and through an air filter system drawn directly into the blower housing, bypassing any heat or contaminants collected in the evaporative cooler cabinets dead space, thereby providing cooler, hygienic air into the area to be serviced. Those familiar in the present art can, and will, appreciate the improved design of the present invention which includes, but is not limited to the following synopsis. The present invention being funnel inductors wherein by their unique design the evaporative cooler's motor and other components are removed and separated from the evaporative humidity produced during times of operation; attention is also drawn to the improved, separated, independent water containment compartment, water pump and water filtering system, therein eliminating rust and corrosion to the sump pan; in addition the new and improved swing-out motor mount bracket, provides for easier access during maintenance, repair or motor replacement; further attention is drawn to the improved design of the permeable cooling pads, wherein new technology has been incorporated providing for a substantial increase in water retention, and at the same time incorporating an improved air filter system, therein reducing greatly most airborne contaminants, thereby producing cooler, hygienic air into the space to be serviced; in addition, attention is now returned to the present invention, the funnel inductors by their new and unique design and incorporation into the fabrication of the improved evaporative cooling cabinet, substantially increasing the structural strength, thereby increasing the life and durability of the present invention; and improved evaporative cooler.

SUMMARY OF THE INVENTION

It is an object of the present invention to provide an improved evaporative cooler.

It is a still further object of the present invention to provide an improved evaporative cooler which incorporates a new and unique design for funnel induction, supplying fresh air directly into the blower housing.

It is yet another object of the present invention to provide an improved evaporative cooler, wherein a divided blower cage has been incorporated thereby providing independent funneled induction of fresh air to and from both sides.

A further object of the present invention is to provide an improved evaporative cooler wherein the new and unique funnel inductors allow each side to operate independently of the other thereby allowing maintenance or repair of either side, without the necessity of interrupting service while still having the capability of producing fifty percent continuous service during times of maintenance or repair of either side.

A still further object of the present invention is to provide an improved evaporative cooler wherein, the new and unique design of the funnel inductors supply an increased volume of air into the blower housing, thereby increasing the total output and velocity of cooled air.

Yet another object of the present invention is to provide an improved evaporative cooler wherein, the supply of fresh air is drawn directly through the water retention permeable cooling pads through the new funnel inductors directly into the blower housing, therein bypassing any heat and airborne contaminants collected inside the evaporative cooler cabinet's dead space.

It is a still further object of the present invention to provide an improved evaporative cooler, wherein the blower cage has been redesigned and located center line, inside the evaporative cooler cabinet, thereby maximizing the efficiency of the new and unique funnel inductors.

A further object of the present invention is to provide an improved evaporative cooler wherein, the unique design of the funnel inductors substantially increase the structural strength of the evaporative cooler cabinet.

A still further object of the present invention is to provide an improved evaporative cooler wherein, the unique design of the funnel inductors, eliminates rust and corrosion to the motor and other components located inside the evaporative cooler cabinet.

It is yet another object of the present invention to provide an improved evaporative cooler wherein, the new and unique design and incorporation of the funnel inductors virtually eliminates corrosion of the motor and other components housed inside the evaporative cooler, caused by moisture.

A still further object of the present invention is to provide an improved evaporative cooler wherein, a safety port belt cover is incorporated into the funnel inductor design and manufacture.

It is a further object of the present invention to provide an improved evaporative cooler including a newly designed replaceable water return tray, said water tray being designed with a built-in slope bottom, providing for one end to always be higher and the other end always lower, thereby maximizing water return and eliminating any chance of standing water.

It is another object of the present invention to provide an improved evaporative cooler wherein, the electric power supply motor is securely mounted onto a swingout motor mount support bracket thereby providing safe and easy access during times of maintenance, repair or replacement.

It is a still further object of the present invention to provide an improved evaporative cooler wherein a dual female electrical receptacle is provided, thereby providing safe and easy quick disconnect of the evaporative cooler's water pump or electric power supply motor, during times of maintenance, repair or replacement.

Still a further object of the present invention is to provide an improved evaporative cooler wherein, the water reservoir used for wetting of the permeable pads, is contained inside a replaceable self-contained compartment, said compartment having a bottom and four sides and a swing apart compartment lid which is secured in a closed position with a quick release latch, said compartment lid having a split orifice positioned to allow the evaporative cooler's water pump shaft passage through said compartment lid, thereby creating a snug fit of the compartment lid against the water pump shaft, therein holding the moisture, and trapping the water evaporation inside the water reservoir compartment, eliminating corrosion to the water pumpmotor, which by this new unique design and application, is located on top of and, outside of the water reservoir, and in addition, also eliminating corrosion to the electric power supply motor and other components located inside the evaporative cooler cabinet, therein reducing maintenance and extending the life time of said components.

Yet another object of the present invention is to provide an improved evaporative cooler wherein, the water control float is securely located inside the water reservoir compartment, therein reducing the possibility of damage.

It is yet a still further object of the present invention to provide an improved evaporative cooler wherein, the water pump and replaceable filter screen is securely mounted inside the water reservoir compartment, therein providing easy access during times of maintenance, repair or replacement.

A still further object of the present invention is to provide an improved evaporative cooler wherein, the presence of the new and unique design of the water reservoir compartment and, the location of said compartment, when installed inside the evaporative cooler cabinet provides that the main water supply line, water return lines, water pump supply line, overflow line and drain lines are all located as to provide easy access during times of maintenance, repair or replacement.

It is another object of the present invention to provide an improved evaporative cooler wherein, maintenance is reduced and life time of the sump pan extended by the reduction of calcium buildup and other contaminants.

It is yet another object of the present invention to provide an improved evaporative cooler wherein, the blower cage is secured into the blower housing by means of a 3-way spider bearing, thereby providing a quick release locking system of the divided blower cage, further providing for removal of either or both sides of the divided blower cage, directly through the openings in the blower housing, therein providing easier access during times of repair and maintenance or replacement of divided blower cage or spider bearings.

It is a further object of the present invention to provide an improved evaporative cooler wherein the evaporative cooler cabinets new design and the unique utilitarian features of the funnel inductors reduce the need of the wettable air permeable pads from three, as known in prior art, to the present two, in addition by the same designs and features before said, dramatically increase the volume of air flow into and from the blower cage, thereby providing a larger supply of evaporative air into space of service.

It is a further object of the present invention to provide an improved evaporative cooler wherein, the wettable air permeable pads are supplied by one single water pump supply line, said supply being brought about by the incorporation of a T-fitting, located near the top inside of the improved evaporative cooler cabinet, therein dividing into two lines for the supply of each individual side.

It is a further object of the present invention to provide an improved evaporative cooler wherein, an improved designed water distribution tray having a deep V design and incorporating the new technology of the present invention wettable air permeable pads, actually reduces the water supply, as needed in prior art, and increases the cooling capacity of the improved evaporative cooler, said improvement being brought about by the increased, constant and continuous water shed onto said improved permeable pads, provided and supplied, in and by said improved water distribution tray.

Still a further object of the present invention is to provide an improved evaporative cooler wherein, the unique designed deep V water distribution tray, before said, also incorporates a newly designed flange which extends the full length of said water tray, said flange being incorporated to secure the wettable air permeable pads and fiber filter system securely in place at the top of pad frame, thereby assuring an even shed over said wettable air permeable pads.

A still further object of the present invention is to provide an improved evaporative cooler wherein, a newly designed pad frame retainer tab has been incorporated and attached onto the outside of the water distribution tray flange, said retainer tab being incorporated to secure the top uppermost pad frame in place, said pad frame being secured on both sides and bottom by the evaporative cooler cabinets pad frame holders.

Yet another object of the present invention is to provide an improved evaporative cooler wherein, the unique designs of both the permeable pad holder frame and the evaporative cooler pad frame, allows insertion of said permeable pad holder from the top to the bottom of said evaporative cooler pad frame, therein securing permeable pad holder into the existing channel of said evaporative cooler pad.

A still further object of the present invention is to provide an improved evaporative cooler wherein, technology has been incorporated into the design of the new and improved wettable air permeable pads, said pads comprising of one part plastic absorbent retention pad, said pad being more absorbent and one-half as thick as prior art, requires less water, the other part of said pad being coarse plastic fiber filter, therein providing an air filter, water barrier thereby, preventing moisture from being drawn into the funnel inductors while greatly reducing the humidity content into space to be serviced, at the same time creating greater evaporation.

Yet a still further object of the present invention is to provide an improved evaporative cooler whereas, a new and unique louvered back access panel has been incorporated allowing for quick and easy access to the interior components of the evaporative cooler during times of maintenance or repair, and providing ventilation to the electric power supply motor, thereby allowing heat to escape the improved evaporative cooler cabinets dead space.

The above and other objects, features and advantages of the present invention will be more clearly understood from the following detailed description taken in conjunction with the accompanying drawings, in which:

DESCRIPTION OF THE PREFERRED EMBODIMENTS

Figure 1:
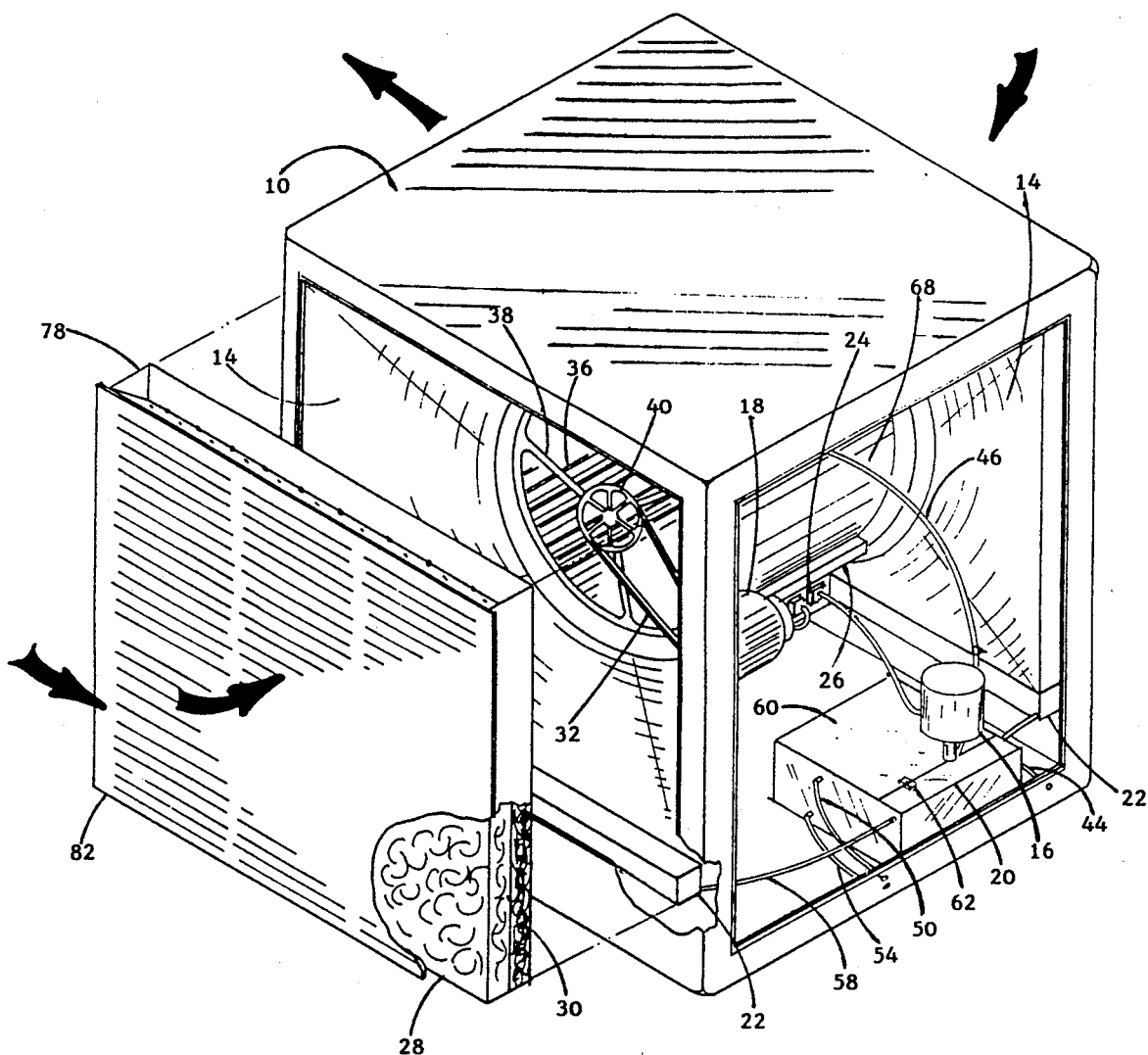
FIG. 1 is a rear oblique view in perspective with the side panel removed showing one of the improved cooler pads being exploded away for purpose of illustration.

Turning now to the drawings in which like reference numerals indicate corresponding elements throughout the several views, attention is first directed to: FIG. 1, which shows a conventional evaporative prior art cooler cabinet 10 shown with the cooler pad frame 82, and vented back access panel 84 removed to clearly expose inner components of the present invention, it being understood that the reverse side of the present invention is the exact mirror image. The funnel inductors 14 shown are fabricated and formed, from a non-corrosive material dimensions being determined by existing prior art evaporative cooler cabinets. The funnel inductors are fabricated with a flange turned out for connection to the evaporative cooler housing 10 and to the blower housing 68, by such means as welding, screws, riveting, etc., etc.. Said funnel inductors 14 creates an increased vacuum of air by its very design, removing the necessity of air and generated or trapped heat being drawn from the inside dead space of prior art evaporative cooler cabinets, generated by working components and atmospheric conditions. Fresh air is continuously drawn separately and equally through the improved absorbent fiber pad 30, directly into the divided blower wheel 36, thereby increasing the volume drawn and increasing the velocity of cooled air provided.

Figure 2:
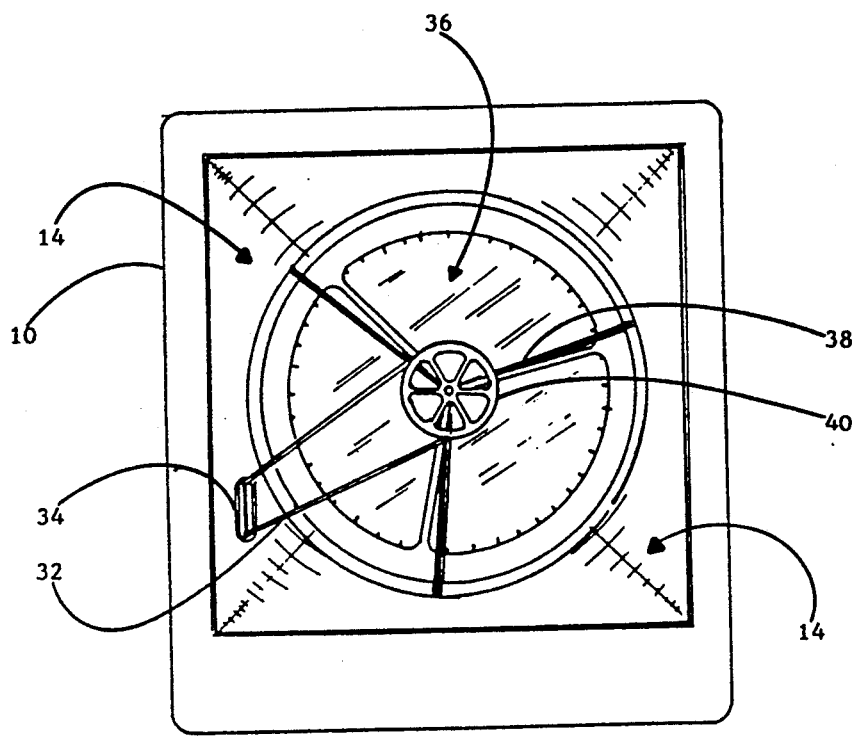
FIG. 2 is a side perspective view of the evaporative cooler showing the present inventions funnel inductor and safety port for the motor belt.
Figure 3:
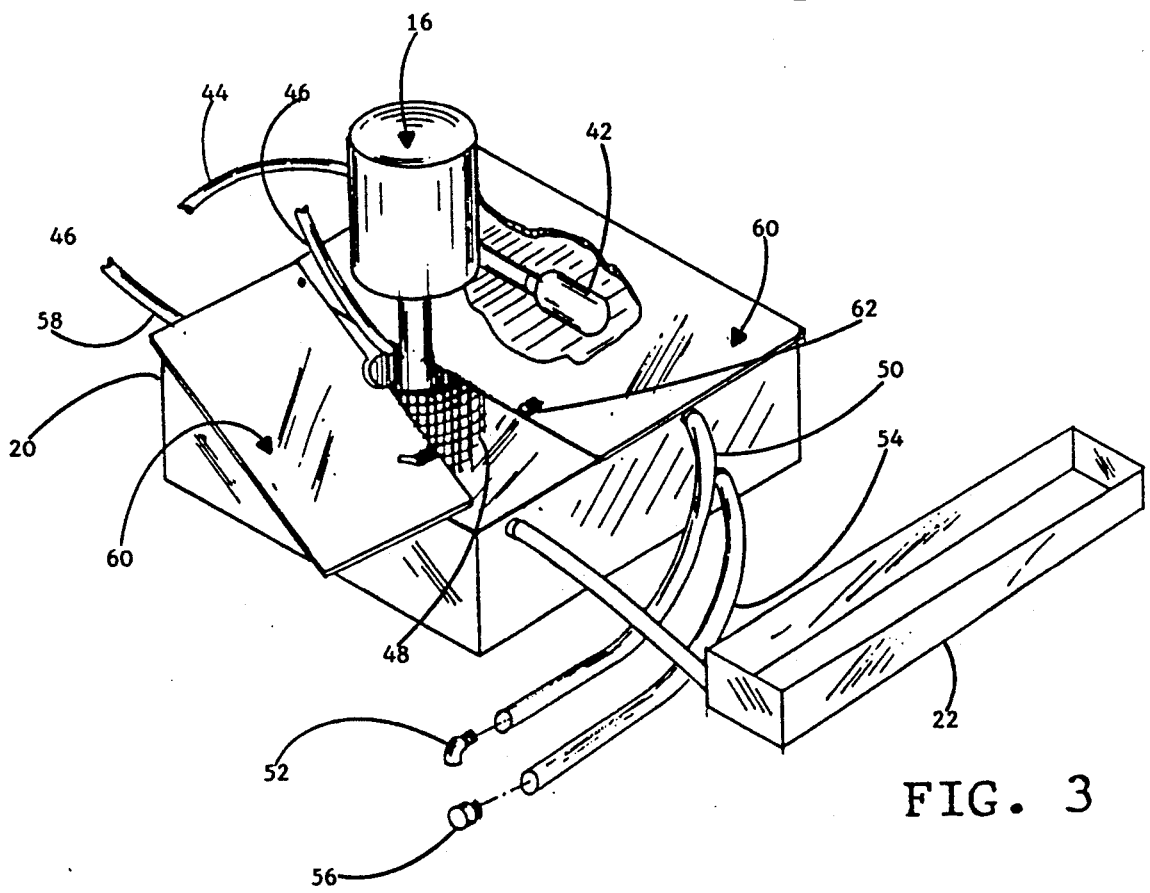
FIG. 3 is a perspective view showing the water reservoir compartment with the lid opened to reveal details of the water pump and a partially exploded view revealing the water pump float.
Figure 4:
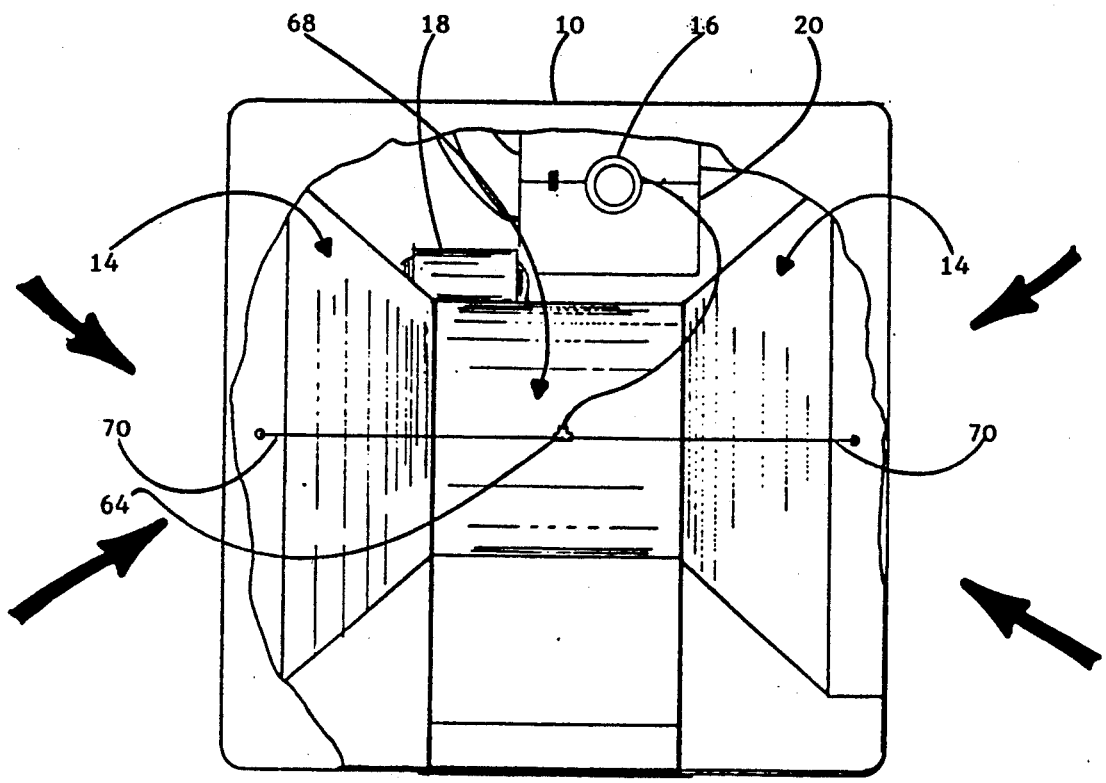
FIG. 4 is a top exploded view revealing the present invention funnel inductors, blower housing, water supply lines, electric motor and water reservoir compartment.
Figure 5:
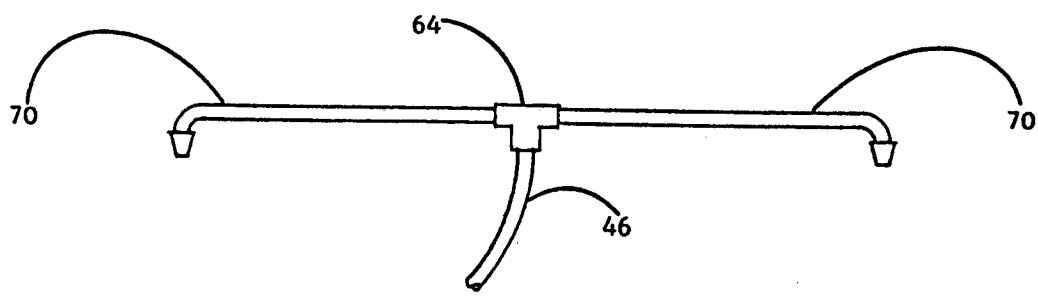
FIG. 5 shows the water pump supply line and a T-fitting, as illustrated in FIG. 4.
Figure 6:
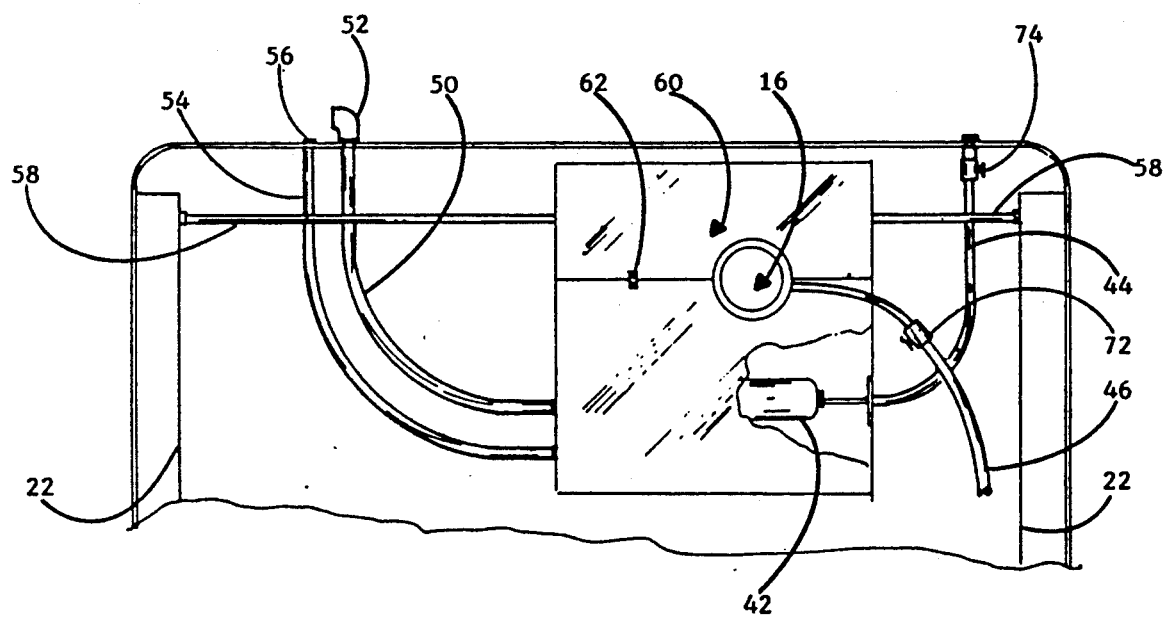
FIG. 6 is a top perspective view of the water reservoir compartment, main water supply line, water pump supply line, overflow line, drain line, water supply lines control valves, water pump, also shown is an exploded view of the water reservoir compartment lid revealing the water level control float.

Attention is now directed to the new and improved sandwich type permeable cooling pads, the outside layer 28 consisting of permeable plastic absorbent fiber requiring 50% less material for fabrication, as known in prior art, at the same time having the ability to provide increased cooling and using less water than evaporative coolers known in prior art. The second half of the improved sandwich type permeable cooling pad, 30 consists of a coarse plastic fiber which provides a moisture barrier, increasing the evaporation process, thereby reducing the amount of humidity normally produced during times of operation, as known in prior art. By incorporating the use of these two different types of fibers into a sandwich type pad, the results are, in addition to those stated above, dual filters for air being drawn through them, thereby reducing the amount of airborne contaminants and providing a more hygienic air supply. FIG. 2 illustrates the funnel inductors 14, the divided blower wheel 36, a safety port drive belt cover 34, the divided blower wheel pulley 40, the blower drive belt 32, and the spider bearing 38, that supports and secures the divided blower wheel 36 and shaft in place. FIG. 3 illustrates a detail drawing of an improved water retention compartment 20, and incorporates an operable water retention compartment lid 60, having a safety latch 62, said compartment housing the water pump 16, water pump screen 48, and water pump float 42. Stem openings are provided on the exterior of the improved water retention compartment 20, thereby providing necessary openings for the various lines, including the main fresh water supply line 44, water return lines 58, water overflow line 50, water compartment drain line 54, the water pump supply line 46 is shown in FIG. 1, 3, 6 and 8. Also illustrated in FIG. 3 is an improved water return tray 22 that incorporates an improved slope design thereby increasing water flow back to the water retention compartment 20. FIG. 4 is an illustration of the top view of the funnel inductors 14, blower cage housing 68, electric supply motor 18, water retention compartment 20, water pump 16, water supply T-fitting and water supply lines 70 for cooling pads. FIG. 5 illustrates a close-up view of an improved cooling pad water supply line. The water supply T-fitting 64 is connected to the cooling pad supply line 70. Said cooling pad water supply line 70 inserts into top of funnel inductors FIG. 4 providing stability for said cooling pad water supply line 70 as shown in FIG. 4 and 5. FIG. 6 is a top illustrated view of the water retention compartment 20, water pump 16, water retention compartment lid 60, water retention compartment lid latch, water level control float, water retention return trays 22, water return lines 58, water retention compartment drain line 54, water retention compartment drain plug 56, water overflow line 52, fresh water supply line 44, needle valve shut off for main water supply line 74 and needle valve shutoff for main water pump supply line 72, providing a means of regulating water flow supply to water retention permeable cooling pads 28.

Figure 7:
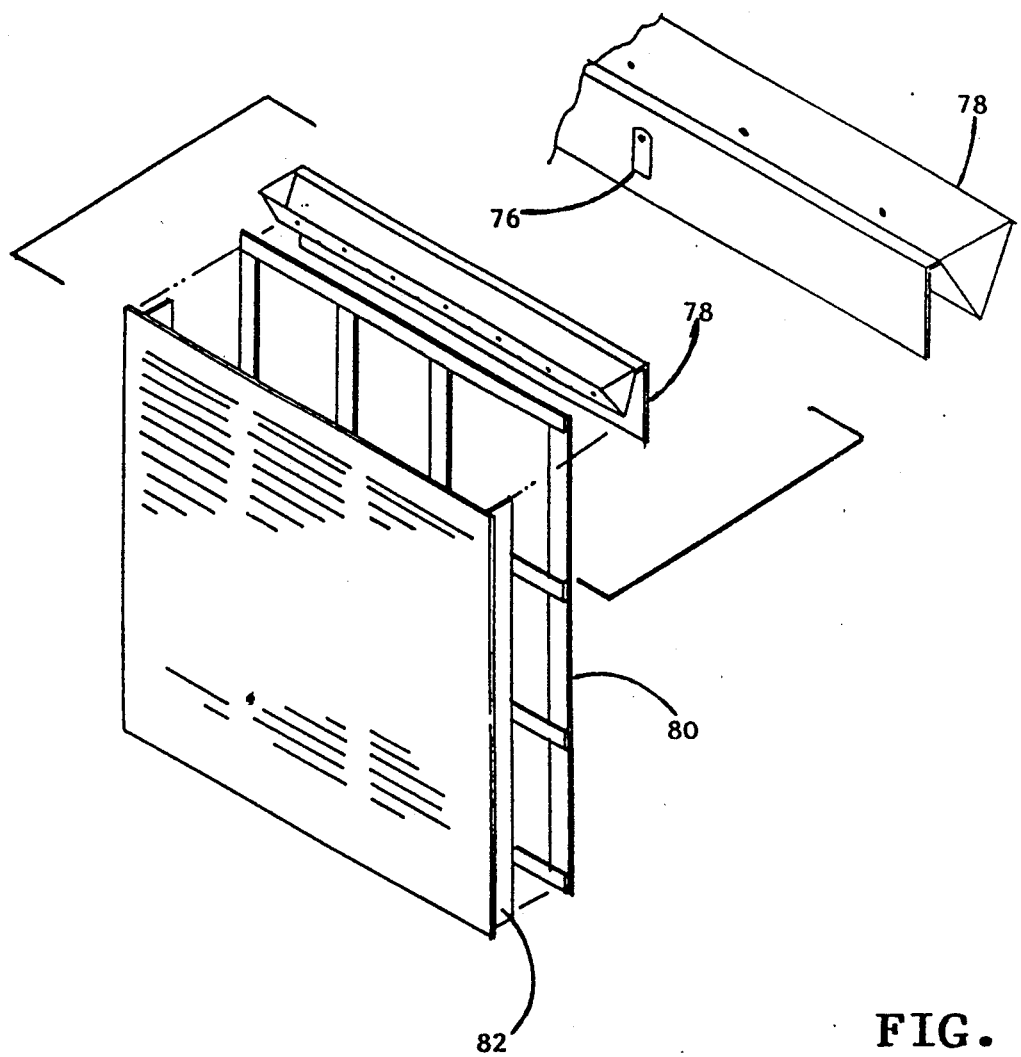
FIG. 7 is a perspective view of the deep V, inclined water distribution tray, the attached retainer flange, with the retainer tab on the flange, the pad frame holder and the ventilated pad frame.

FIG. 7 is an illustrated view of an improved water distribution tray 78, incorporating a pad frame retainer tab 76, said water distribution tray 78, inserts securely into the top of improved pad frame 82, also illustrated is the pad frame retainer 80 which holds the absorbent fiber water retention pad 28 and the non-absorbent fiber filter pad 30.

Figure 8:
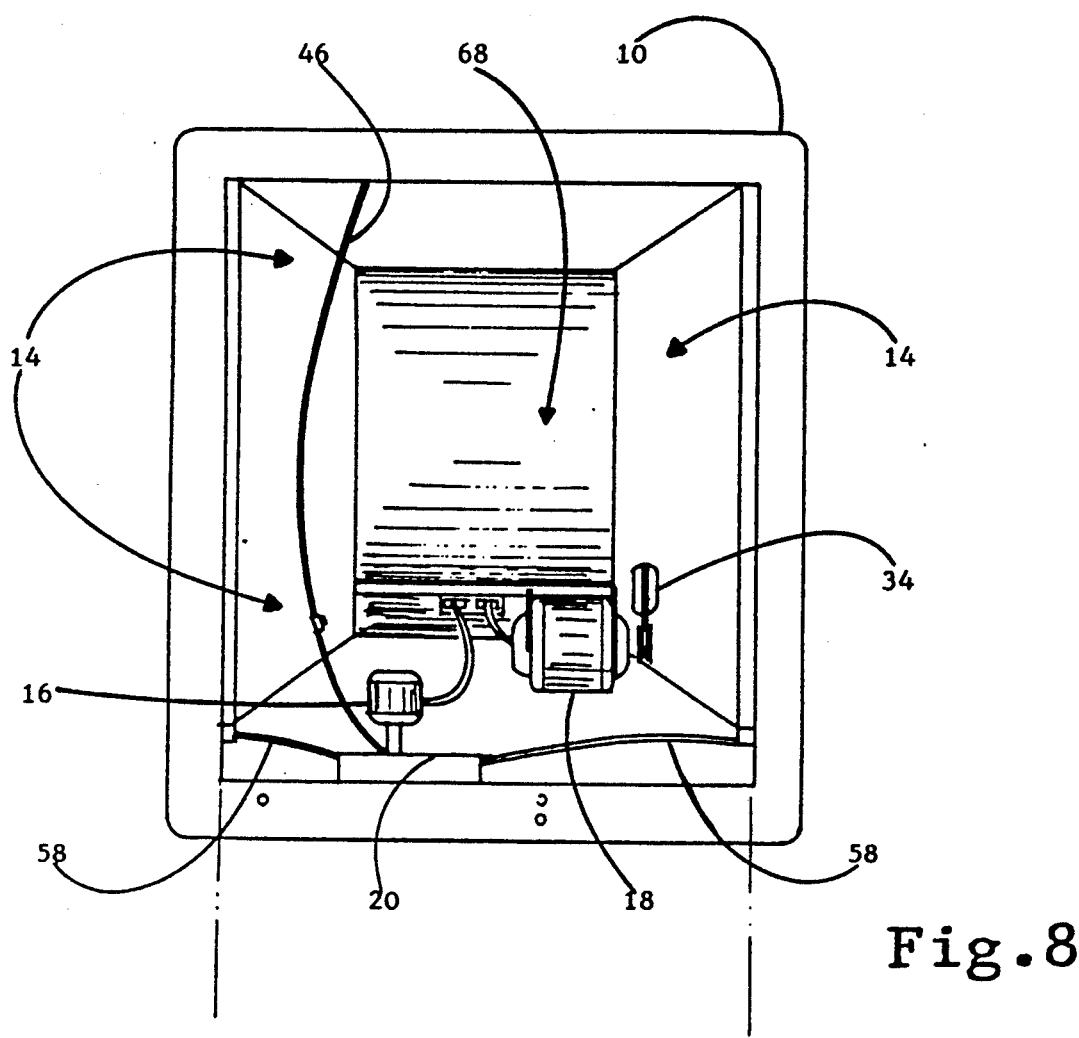
FIG. 8 is a back perspective view of the present invention showing the funnel inductors, blower housing, electric motor, water pump, water reservoir compartment, electric male and female receptacles, safety belt port and water supply and return lines.

FIG. 8 illustrates the back view of the present improved evaporative cooler 10, the funnel inductors 14, blower cage housing 68, water pump supply line 46, water pump 16, water return lines 58, water retention compartment 20, electric motor 18, electrical supply female receptacles 24, which is mounted onto an improved swing away motor mount bracket 26, and the safety port drive belt cover 34.

Figure 9:
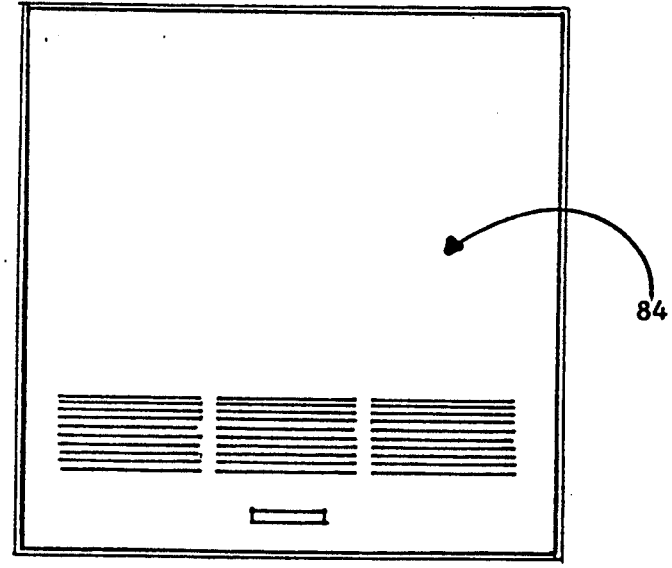
FIG. 9 is a perspective view of the ventilated louvered back panel.

FIG. 9 illustrates an improved vented back access panel 84.

I claim:

1. Means forming an evaporative cooler cabinet, means mounting cooler pads in opposite faces of said cabinet, means to supply water to such pads for evaporation, means mounting a blower having dual inlets and an outlet within said cabinet, and continuous funnel-shaped inductors extending between said cooler pads and said inlets, whereby excess moisture is excluded from other cooler components.

2. Cooler apparatus as defined in claim 1, a motor located in a compartment in said cabinet, and an access panel with louvers mounted in said cabinet to provide access to said motor.

3. Cooler apparatus as defined in claim 1, A replaceable water retention compartment located within said cooler cabinet, means mounting a water pump and water control float within said water retention compartment, thereby eliminating humidity and corrosion to the electric motor and other components within said cooler cabinet, means to supply water to said water retention compartment, means to control water level within said water retention compartment, means of return for excess cooling water to same, means to prevent overflow of said water retention compartment, means of an outlet drain for said water retention compartment, means of separating the water pump from the water pump motor, whereby a divided swing-away compartment lid which provides an orifice for the water pump shaft thus reducing moisture and corrosion to said water pump motor, means to retain water, moisture and humidity thereby eliminating rust and corrosion to the cooler's sump pan.

* * * * *